March 17, 1959  R. L. PROPST  2,877,519
DETACHABLE JOINT CONNECTION FOR USE WITH KNOCK-DOWN UNITS
Filed Oct. 21, 1955

INVENTOR.
ROBERT L. PROPST
BY *Philip H. Sheridan*
ATTORNEY

United States Patent Office 2,877,519
Patented Mar. 17, 1959

2,877,519

DETACHABLE JOINT CONNECTION FOR USE WITH KNOCK-DOWN UNITS

Robert L. Propst, Englewood, Colo., assignor, by mesne assignments, to Beauty Products, Ltd., Denver, Colo., a corporation of Colorado Application October 21, 1955, Serial No. 541,929

1 Claim. (Cl. 20—92)

This invention relates to a new article of a manufacture and particularly to detachable joint connections for a knockdown case structure or any similar unit where it is desirable to dismantle the parts for shipping or the like and reassemble same with the greatest of ease and at the same time provide a rigid and durable construction. In its broadest aspects, this invention relates to detachably joining in locked and stable condition panel or other parts used in assembling a knock-down unit.

Articles of this general type are numerous, but it is well recognized that it has been difficult to provide a simple technic for assembling and disassembling elements of a unit such as a knock down case. Also, prior art units of this type have been difficult to completely lock when assembled, or else to accomplish the job satisfactorily numerous bolts and the like must be employed. Still further, most of the presently available arrangements of this general type incorporate upstanding dowels or the like and this makes fabrication difficult as the parts of the structure cannot be purchased in stock lengths. Additionally, past articles of manufacture of this general type incorporate numerous fragile parts and usually require the parts to be of exacting tolerances in order that the assembled unit will be of satisfactory appearance. There are numerous other difficulties, requirements, failures and defects in the prior art structure and the above discussion is only exemplary of these defects.

It is the primary object of this invention to provide a knock-down structure which overcomes the difficulties of the type enumerated above.

Another important object of the invention is to provide an improved detachable joint connection for panel or other parts used in assembling a knock-down unit.

A further object of this invention is to provide a knock-down structure which is simple to manufacture at a minimum expense, which may be readily assembled and disassembled and which, when assembled, has its parts maintained in locked and durable condition.

Yet another object of this invention is to provide an article of manufacture of the type described which contains no fragile parts, which is attractive in appearance when assembled and which requires none of the parts to be made of exacting tolerances.

Other objects and advantages of the invention will become apparent upon considering the following detailed description in conjunction with the drawings wherein like numerals represent similar parts throughout and wherein.

Figure 1:
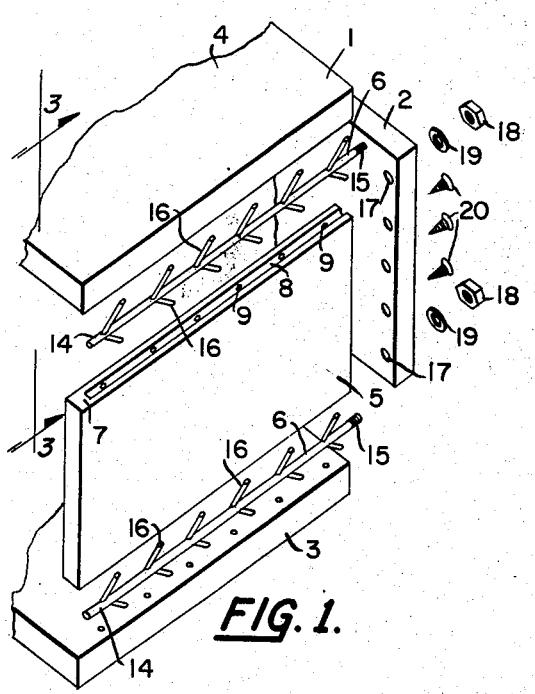
Figure 1 is a broken away perspective view of a portion of the knock-down structure illustrated.

Prior to describing the parts in detail, it should be mentioned that knock-down units to which this invention is particularly applicable are made generally from wooden material or some equivalent thereof. However, the scope of the invention is not to be so limited as the principles could readily apply to metallic or plastic units. Also, the embodiment illustrated on the drawing relates to a knock-down case including a top, back and bottom walls, side walls and an open front, all of the walls or panels being arranged for detachable assembly whereby they may be readily shipped in disassembled condition. It is to be understood that the essence of this invention is intended to apply to and cover detachable joints for panel elements and other articles of manufacture, such as tiles, transferable walls and various knock-down units where disassembling thereof for shipping and other purposes is desirable.

Considering the exploded view of Figure 1 and detailed views 2, 3 and 4, a knock-down case is generally represented by numeral 1 and is to include, for example, an open front, a back wall 2, a bottom wall 3, a top wall 4 and side walls 5, only one of the latter being shown. Two elongated units 6 are employed in connection with attaching each side wall to the bottom and top walls and the back wall. Since each member 6 is identical, an explanation will be furnished only in connection with the installation of one such member.

Along the top longitudinal surface 7 of the side wall 5 shown there is provided an elongated recess 8, illustrated as extending substantially the entire longitudinal length of the side wall 5. Communicating with this recess 8 and extending within wall 5 are angled sockets 9 and each socket preferably forms an acute angle with surface 7 of about 50 degrees. It is to be noted that these sockets or slots 9 are spaced apart in parallel relation and any suitable number may be employed. The under surface 11 of wall 4 is likewise provided adjacent the edge that is to be superposed or positioned on top of the side wall 5 with upwardly extending sockets 12. These latter sockets are also spaced apart in parallel relation and form with the corresponding sockets 9 when the walls 4 and 5 are positioned together as shown in Figure 2 a combined socket in the shape of a substantial right angle but slightly greater in size, say an angle of about 100 degrees.

Member 6 consists of an elongated body portion 14, this being shown as round in configuration and of a diameter having a size that will fit within the confines of the illustrated U-shaped recess 8. Body portion 14 extends a length greater than the longitudinal length of slot or recess 8 plus the width of back wall 2 and is provided at one end with threads 15. At spaced intervals on body portion 6 and at diametrically opposed points there extends wing members 16, each of which form an angle with the body portion 14 of about 45 degrees and thus the smallest combined angle between opposed wing segments 16 is about 90 degrees.

Figure 2:
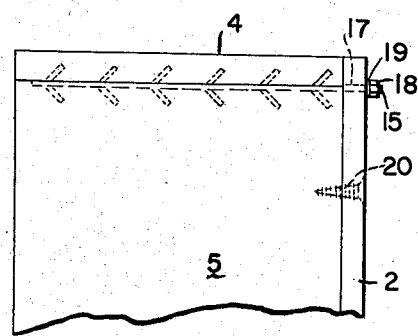
Figure 2 is a side view, partly broken away, of a portion of the assembled structure of Figure 1.
Figure 4:
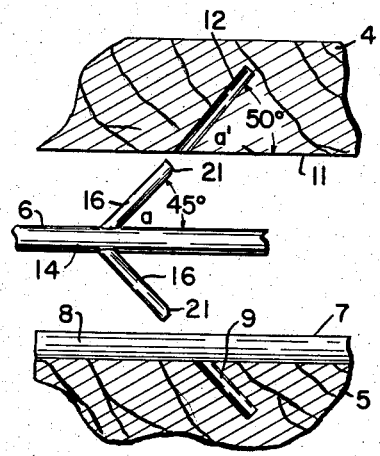
Figure 4 is an exploded detail view of a portion of the structure of Figure 1.
Figure 3:
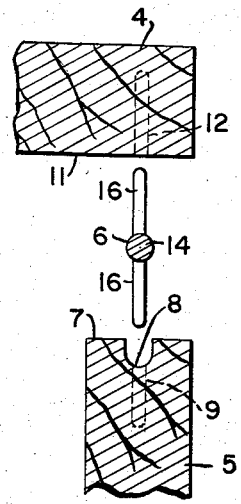
Figure 3 is a view taken along the direction of the arrow 3 of Figure 1.

In assembling each member 6, it is positioned in recess 8, as shown in Figure 2, with the lower wings extending in slots 9. Next the wall 4 is positioned in place so that it receives the upwardly extending wings 16. Thereafter the threaded tip of portion 14 is inserted through an aperture 17 of the back wall 2 and a nut 18, preferably preceded by a washer 19, is applied to the threaded tip. When the nut 18 is tightened, it applies a separating pressure to the wing members and a pulling force on walls 5 and 4. This action is continued until the assembly takes the form shown in Figure 2 and it should be noted that since the angle between each pair of wing members is less than the angle between each pair of slots, there is an added biting action that takes place to firmly lock the walls or panels 4 and 5 together. If desirable, although by no means necessary, screws 20 may be inserted in the back wall 2 and screwed into the ends of the side wall 5. It should be apparent from the foregoing that the members 6 provide a ready assembling and disassembling of wall structure used in a knock-down unit and that when the additional parts or panels of unit 1 are assembled in a like manner, all are locked securely and durably. Furthermore, due to the recess 8, there is no unsightly appearance as to the eye as all that is exposed is nut 18. As illustrated, each wing 16 is shown as being a solid round rod, but these wings could be changed, and probably preferably so, to take the shape of hollow U-shaped members whereby such would provide increased resiliency during the binding action.

It has been previously mentioned that the principles of the invention are applicable to couple just panels or the like, such as walls 3 and 5 and without use of a third or support wall 2. This may be done by merely reducing the length of body 14 so that only its threaded tip extends from recess 8 and employing a U-shaped clip having pointed legs that may be driven into walls 3 and 5 and an opening in its base through which the threaded part 15 may extend to receive a nut 18. Of course, the only reason for reducing the length of body portion 14 is to permit use of a smaller clip and to avoid any unattractive appearance, due to there being too much of member 6 extending beyond the panels.

Preferably, the tips of wings 16 are slightly tapered or rounded or otherwise reduced as at 21 to facilitate travel of the wings within slots 9 and 12. It is apparent that the amount and strength of the lock formed between connected panels will vary in accordance with the number and spacing of the wings 16 and cooperating slots 9 and 12. Also, although it is preferable to have a difference in the angles as at *a* and *a'* in the drawing for the reasons pointed out herein, substantially the same results could be accomplished by having the angles identical and increasing the tightening effect of bolt 18. In this connection it should also be apparent that the wing member 6 is adjustable itself to overcome certain inaccuracies in tolerances of the various unit parts.

It is believed that in view of the foregoing description it will be apparent that the invention accomplishes the objects outlined. However, it is to be understood that various modifications may be made, such as employing the principles of the wing member as the locking means at a miter joint formed by two panels. Further, the wing member may be used to permanently lock various elements together such as walls or tiles and as to the latter type of articles, the angled sockets would have to be in the nature of the true slots or recessed areas due to the normal thickness of the tiles. Therefore, I desire it to be understood that the scope of my invention is not to be limited to any specific disclosure, but is to include the fundamental principles involved as defined by the terms and equivalents of the appended claim. In the claim the term "socket" is intended to cover holes, slots, recesses, grooves or openings.

I claim:

A detachable joint connection of the type described including at least a first member connectable to a second member with both members having meeting faces at the area of connection comprising spaced cooperating angled sockets in both members, an elongated element having a body portion and spaced angled wings receivable in the sockets extending therefrom, and means connectable to the body portion after the wings are received in the sockets for applying a separating pressure to the wings for locking the members together and for drawing the faces into binding and locked engagement at least one of the faces being grooved to provide an elongated recess to receive the body portion whereby the faces of the first and second members directly abut each other when locked together, said recess extending in the one face along the longitudinal length thereof from adjacent but spaced from one end of the face to the other and whereby a part of the body portion may extend from the other end of the recess for receiving the connectable means.

References Cited in the file of this patent

UNITED STATES PATENTS

| 622,118 | Chase | Mar. 28, 1899 |
| 1,736,883 | Macdonald | Nov. 26, 1929 |
| 2,400,162 | Mulligan | May 14, 1946 |
| 2,732,044 | McClune | Jan. 24, 1956 |

FOREIGN PATENTS

| 419,011 | Great Britain | Nov. 5, 1934 |
| 233,812 | Switzerland | Nov. 16, 1944 |